C. Perley,

Windlass.

No. 1345. Reissued Oct. 7 1862.

Witnesses

Chas. H. Smith

Thos. Geo. Harold

Inventor:

Charles Perley

AM. PHOTO-LITHO. CO. N.Y. (OSBORNE'S PROCESS)

UNITED STATES PATENT OFFICE.

CHARLES PERLEY, OF NEW YORK, N. Y.

IMPROVEMENT IN COMPOUND CAPSTANS IN SHIPS.

Specification forming part of Letters Patent No. 17,940, dated August 4, 1857; Reissue No. 1,345, dated October 7, 1862.

*To all whom it may concern:*

Be it known that I, CHARLES PERLEY, of the city, county, and State of New York, have invented, made, and applied to use certain new and useful Improvements in Means for Working Chain-Cables, which I denominate the "Compound Capstan-Windlass"; and I do hereby declare that the following is a full, clear, and exact description of the construction and operation of the same, reference being had to the annexed drawings, making part of this specification, wherein—

Figure 2:
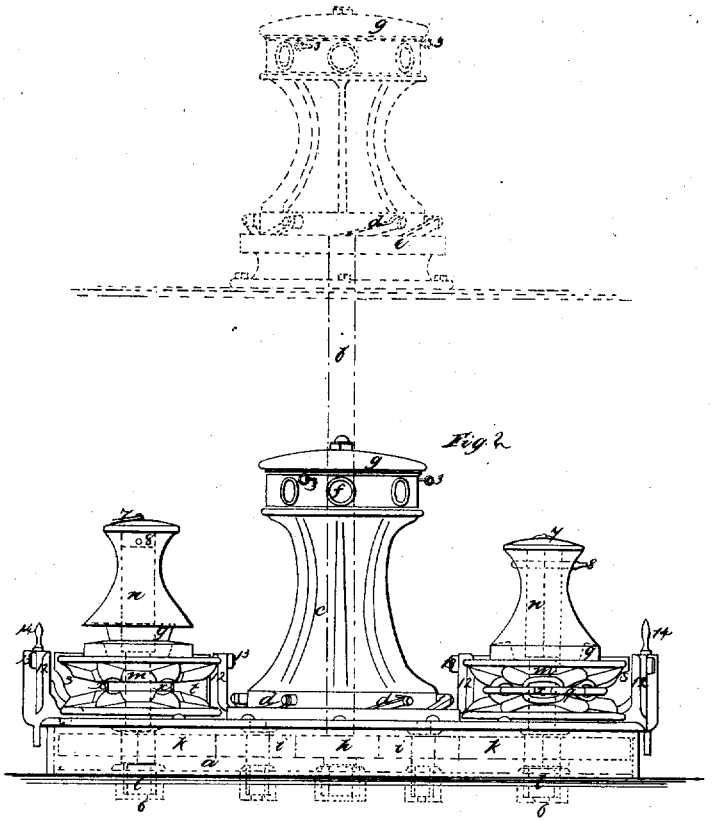
Figure 3:
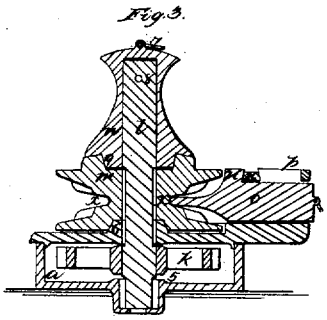
Figure 1:
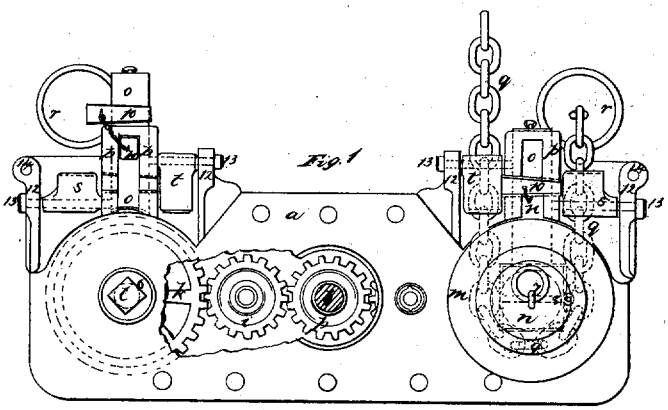
Figure 5:
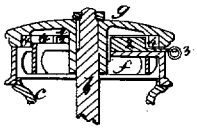
Figure 4:
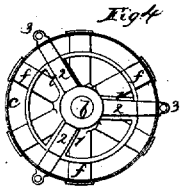

Figure 1 is a plan of my apparatus with the capstan and one heaver removed to show the gearing and other parts, the base being shown as partly broke open for the same purpose. Fig. 2 is an elevation of the apparatus with one heaver operating on a chain while the other is disconnected. Fig. 3 is a cross-section through one of the heavers. Fig. 4 is a plan, and Fig. 5 a vertical section, of the capstan-head, showing the manner of connecting and disconnecting the same from its shaft.

Similar marks of reference denote the same parts.

In the windlasses heretofore constructed a chain-wheel or heaver has been employed below a capstan barrel, and the power to revolve the same has been communicated to such capstan by handspikes introduced in the head thereof. In all such instances it was necessary to remove the capstan and parts giving motion to the heaver before the heaver could itself be changed. It is often necessary to remove the chain-wheel or heaver in consequence of the vessel being supplied with a different chain cable, rendered necessary by a change of anchors or loss of cable, and the removal of all the parts of the capstan to apply a different heaver is a great inconvenience. In almost all vessels two chain cables are provided, and it is necessary often to draw one in and give out the other, or to draw both in or give them out at the same time. A capstan is also required for general purposes.

My invention consists, first, in a removable heaver on a vertical shaft, sustained and rotated from below said heaver by gearing, in combination with a second shaft carrying a capstan or capstan-head, and with gearing between said shafts so that the heaver can rotated by means of said capstan or capstan head, and it can be changed to suit the chain without disturbing the capstan or capstan head, and any injury to the heaver does not affect the capstan or capstan-head; second, in a capstan that can be connected to or disconnected from the vertical shaft, in combination with a chain-wheel or heaver on a separate vertical shaft, the two shafts being geared together, as aforesaid, whereby the capstan can be employed independently of the shaft on which it revolves, or be employed to revolve that shaft and the aforesaid heaver in either direction, as set forth; third, in an adjustable block that takes an external bearing against the heaver to sustain the same against the action of the chain and relieve the shaft of said heaver from the friction that would result from the revolution thereof in the heaver while the heaver was under the strain of the cable; fourth, in the combination of a power-capstan and coupling with said heaver to connect or disconnect the same from the shaft.

In the drawing, *a* is the base of the capstans, formed as an elongated hollow box, which is secured to the desired place by suitable bolts, and carries the other parts of the apparatus.

*b* is a vertical shaft in the center of said box, receiving on its upper end the capstan *c*. This capstan *c* may be immediately above the base *a*, or be located in the forecastle or hurricane-deck, the shaft *b* being extended vertically for this purpose. The capstan-barrel *c* is to be fitted so as to revolve on, but independent of, the shaft *b*, by means of handspikes in the sockets *f*, and the barrel is to be sustained on balls or otherwise to support its weight and relieve friction.

*d d* are the pawls, and *e* is the pawl-bed, as usual.

*g* is the capstan-head, keyed upon the end of the shaft *b*, (see Fig. 5,) and the head *g* and barrel *c* are to be connected together, when it is required to rotate the shaft *b*, by means of sliding blocks 2 2, set in slides 1 1 in the top of the barrel *c*, and said blocks 2 are provided with tongues passing through mortises around the handspike-head, terminating with rings 3 3, and around the inside of the head *g* notches 4 4 are provided, so that the barrel and head are connected permanently by sliding the blocks 2 2 outward into the notches 4 4, which notches, being near the largest part of the head, act with the best leverage in rotating the shaft *b*. Near the lower end of the shaft *b* is gear wheel *h*, taking two intermediate gears, *i i*, to the wheels *k k*, all within the base *a*, and the wheels *k k* are on the short vertical shafts *l l*. Both of these shafts *l l* are to be used where two heavers are fitted to my apparatus, but where only a single heaver is used one shaft and its gears may be dispensed with; and as both heavers are alike and operate similarly, I shall only describe the construction and operation of one. The shaft *l* is set in a step, 5, and is formed square to receive the wheel *k* and other parts. 6 is a bearing for said shaft *l* in the cover of the base *a*, and said bearing is formed as a square opening, although it might be round if the wheel *k* were keyed onto a round part inserted through the bearing 6, and the square shaft *l* is turned round at this part and also for the length of the heaver *m*, which is formed with a square hole, and is dropped over the square upper part of the shaft, but said shaft can rotate in the heaver without turning the same, because of the shaft being round, as before mentioned.

*n* is a small capstan-barrel, formed with a square hole fitting the said shaft *l*, and rotated with the same, or a slot and key might be used instead of the square shaft. 9 is a square formed on the lower end of the barrel *n*, taking a similar square in the heaver.

7 is a ring, by which the barrel *n* can be lifted sufficiently to clear the square coupling 9 and disconnect the heaver, in which case the pin 8 is inserted through a second hole in the shaft *l* or over the upper end of the same, to sustain said head, and when in this position the said barrel *n* can be rotated independently of the heaver to form a power-capstan, or act as a bit receiving a rope or chain; or when lowered so as to couple (at 9) with the heaver *m*, and the pin 8 inserted through a hole in the shaft *l*, so as to hold said coupling together, the said barrel *n* rotates said heaver *m* in either direction, according to which way the capstan is turned, and either draws in or gives out the chain, as next set forth.

The heaver *m* is of a size and shape to receive correctly the chain with a given-sized link, and said heaver can be lifted off and another substituted, adapted to a different chain should the same be required; or, where double heavers are used, one side may be fitted for one chain and the other for a lighter or heavier cable. In all cases the heaver is to be formed with a deep groove at *x*, which takes one side of the horizontal links, and is to be turned off, or otherwise trued, at the bottom of said groove so as to receive the thin curved projecting end of the bearing-block *o*. This block *o* is set in sides *p*, and provided with a block, 11, (or its equivalent, a slot) against which the wedge 10 acts to set the block up against the heaver at *x*, to sustain the same, and relieve the shaft *l* and other parts from strain by the chain, so that the vessel can ride at anchor with perfect safety by this heaver and, to avoid any risk of slipping, the chain *q* may be seized together forward of the heaver and bearing-block.

When the heaver has to be removed, the block *o* is slid back, as seen on one side in Fig. 1. The chain cable may be led into the locker-pipe, as at *r*, or be brought around any suitable friction-roller and carried farther aft before entering the locker-pipe.

In order to afford additional security in working the chain, I form troughs for said chain to move in on each side of the slide *p*, by flanges 12 12, and in said troughs I hang pawls *s* and *t*, set and moving on pins 13, so as to prevent the chain slipping back as the same is drawn in. These pawls are to be thrown over when the chain is running out, and said chain can be run out by simply lifting the capstan-coupling *n*, without taking the chain out of the heaver. 14 14 are belaying-pins, which may be inserted, if desired.

The combined operation of the parts, as well as their separate functions, will be fully apparent from the foregoing, and it will be seen—

First, that the capstan can be used in the ordinary manner; second, that the small barrels *n* can be used as power-capstans or bits; third, that one or both heavers can be used simultaneously with or separately from the other parts; fourth, that the chain can be taken in or given out on either side; fifth, that all strain is removed from the shafts *l*, so that the vessel can ride at anchor with the chains around the heavers, and still the windlass is effective for other uses. The various other advantages of my apparatus will be apparent to nautical men, and need not here be specified.

What I claim as my invention, and desire to secure by Letters Patent, is—

1. A removable heaver on a vertical shaft, sustained and rotated from below said heaver, in combination with a second shaft and capstan or capstan-head, and with gearing between the said shafts, substantially as and for the purposes specified.

2. A capstan on a vertical shaft that can be connected to or disconnected from the shaft, in combination with a chain-wheel or heaver on a separate vertical shaft, the two shafts being connected by gearing substantially as set forth, whereby the capstan can be used separately from the heaver, or both heaver and capstan can be rotated in either direction to take in or give out chain cable, as set forth.

3. The adjustable bearing-block *o*, in combination with the chain-heaver *m*, to relieve the vertical shaft of said heaver from strain and friction that would otherwise result from the weight of the chain or the strain on the same while the vessel is lying at anchor, as set forth.

4. The combination of the power-capstan *n*, coupling 9, and heaver *m*, for the purposes and as specified.

In witness whereof I have hereunto set my signature this 19th day of May, 1862.

CHARLES PERLEY.

Witnesses:
THOS. GEO. HAROLD,
CHAS. H. SMITH.